United States Patent [19]
Chamran et al.

[11] Patent Number: 4,468,601
[45] Date of Patent: Aug. 28, 1984

[54] STEPPER MOTOR CONTROL
[75] Inventors: Mort Chamran, Elmhurst; Alan Ferber, Chicago, both of Ill.
[73] Assignee: The Perkin-Elmer Corporation, Norwalk, Conn.
[21] Appl. No.: 394,552
[22] Filed: Jul. 2, 1982
[51] Int. Cl.³ .......................................... H02K 29/02
[52] U.S. Cl. ................................... 318/696; 318/685
[58] Field of Search .............................. 318/685, 696

[56] References Cited
U.S. PATENT DOCUMENTS
4,147,968 4/1979 Goble .................. 318/685

OTHER PUBLICATIONS
Second Int. Conf. on Small and Special Electrical Machines, Sep. 22-24, 1981, R. Whitaker et al., p. 46, "Microprocessor Control of a Step Motor with Various Inertia Loads".
Hughes et al., "Electromagnetic Damping in Stepping Motors", Proc. IEEE, vol. 122, No. 8, Aug. 1975, p. 819.

Primary Examiner—B. Dobeck
Assistant Examiner—Saul M. Bergmann
Attorney, Agent, or Firm—F. L. Masselle; E. T. Grimes; R. A. Hays

[57] ABSTRACT
An improvement in the operation of a system where the driving means is a stepper motor comprises provision of a special software routine implemented by a microprocessor controlling the delivery of a counted series of pulses to drive the stepper motor. The improved routine removes excitation from the stepper motor when not receiving a series of stepping pulses thus eliminating the heat dissipation of such a motor when not in motion. Loss of position is avoided by utilizing the inherent detenting action of the stepper motor's permanent magnet field. Provision is also made for proper damping to prevent error due to overshoot. Where several stepper motors are used in a system the reduction of heat dissipation permits a significant simplification of the system cooling requirements. A single power supply may be shared among the motors thus further simplifying the system.

6 Claims, 4 Drawing Figures

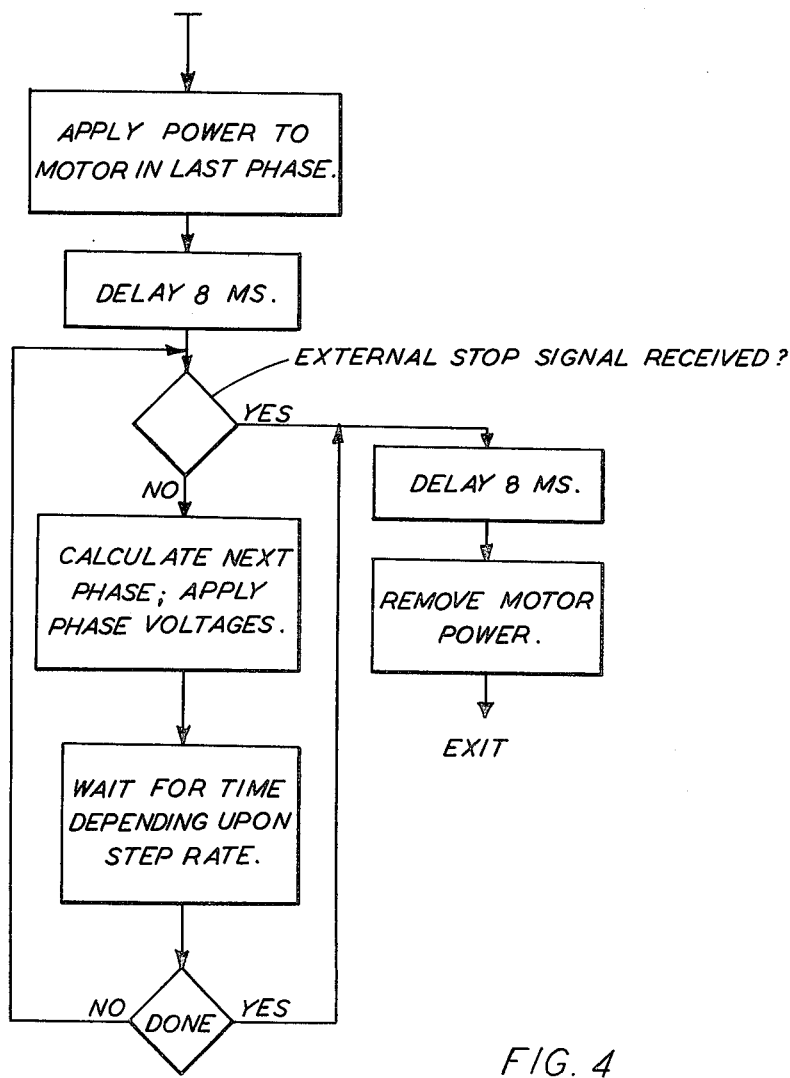

STEPPER MOTOR CONTROL

RELATED PATENT APPLICATIONS

This application is related to the following two U.S. patent applications, both filed Mar. 3, 1982 (1) Ser. No. 06/354,407, filed Mar. 3, 1982, entitled "Chart Recorder", by William C. Muellner and Larry Plunkett; and (2) Ser. No. 06/354,406, filed Mar. 3, 1982, entitled "Strip Chart Recorder", by William C. Muellner and Walter Hvostik.

BACKGROUND OF THE INVENTION

Motors which advance rotationally or linearly in discrete increments of motion are commonly used for exact positioning of a movable part such as the paper chart of a recorder, a dispersing element in a monochromator, a variable control device or any instrumental or mechanical element whose position must be settable by some electrical means. A motor which can be so advanced or stepped is commonly known as a stepper motor. Such motors combine a variety of electrical and mechanical elements, often in quite a small volume. They may be stepped in either direction by switching electrical excitation from one set of actuating windings to another in alternating sequence; each switch operation causing the rotor to advance one step and hold in the new position. By repeating the switching operation alternately a specific number of times or counts a specific change in position will be effected in the position of the motor's armature.

It is common to continue to excite a stepper motor after a predetermined number of counts is completed and the motor is at rest. This holds the motor or "detents" it in its final step position. However, this practice has a disadvantage in that stepper motors are not very efficient at rest and dissipate considerable heat. This can be objectionable where the space available for the motor is confined as, for instance, where the motor is used to drive a recorder chart. It is also objectionable where a number of motors are required for multiple functions or where heat buildup may adversely affect operation of the controlled device.

It is an objective of our invention to provide stepper motor driving means controlled by a microprocessor through software that will have sharply reduced heat dissipation during non-stepping periods.

It is further an objective to retain in this stepper motor driving means the same positioning accuracy as is provided by conventional driving means.

It is another objective to minimize the power supply requirements in multiple motor systems by making possible a common power supply which handles all motors, one motor at a time, without curtailing motor usage or accuracy.

BRIEF DESCRIPTION OF THE INVENTION

For illustration of the invention, its use in an exemplary preferred embodiment of a chart recorder paper drive will be shown, although the invention is by no means limited to this use.

Strip chart recorders are so well known in the art that little needs to be detailed herein about their general structure and operation. Our invention is concerned with an improvement to the chart paper drive of a recorder which uses a stepper motor or the equivalent to transport the paper chart and which uses a microprocessor to control this transport. The microprocessor may also perform other duties such as are described in detail in the Related patent applications previously listed in this application. The foregoing objectives of this improvement and other relationships to the functioning of the recorder of our preferred embodiment are made possible by directing the attention of the microprocessor to a novel subroutine which coacts with the microprocessor to accomplish the stated objectives.

The normal forward or reverse drive of the chart is effected by loading a software counter with a count to be used by a paper drive motor routine. This counter will be decremented by one count at each step of the motor, eventually returning to zero at which time the motor stops until the routine is repeated. The microprocessor controls the above routine. The routine concludes with a section which removes excitation from the stepper motor until its use is again called for. During this idle period the natural detenting action of the stepper motor and the inherent friction of the driven system retain the position reached during stepping. Damping, as required, is also provided by this part of the routine to assure settling of the motor in said position before excitation is removed to prevent error due to overshoot.

BRIEF DESCRIPTION OF THE DRAWINGS

FIG. 3 shows the switching sequence table; and

FIG. 4 shows a flow chart for a multiple motor control routine.

DETAILED DESCRIPTION

The strip chart paper in the recorder of an exemplary preferred embodiment is driven by the conventional sprocket or toothed wheels meshing in holes disposed along both edges of the chart strip. This structure is well known for such recorders. The sprocket wheels are driven by a motor which moves a predetermined angular amount each time an electrical pulse is fed to it by a controlling power supply. The polarity of the pulses determines the direction of rotation; the total rotation is determined by the number or count of the pulses. Such a motor may be the type known to the art as a stepper motor.

Figure 1:
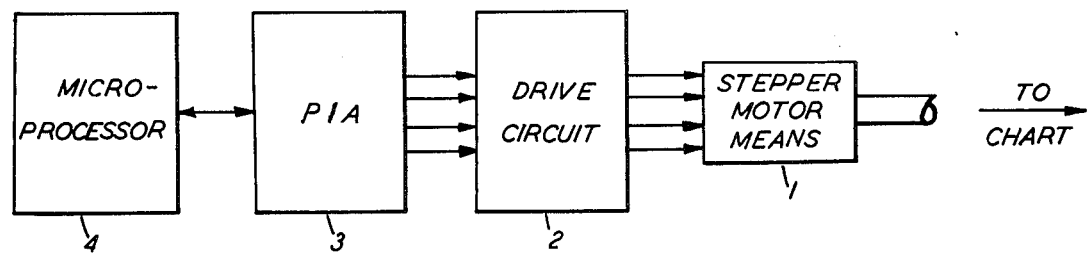
FIG. 1 shows a block diagram of the chart drive system.

FIG. 1 shows a simplified block diagram of the motor drive system. Stepper motor means are indicated at 1, which could be either a simple motor or a plurality of stepper motors. However, only one stepper motor is driven at a time. The stepper motor drives the chart sprockets through a conventional step-down gear train whose gear ratio is chosen so that a given number or count of pulses supplied to the motor will move the chart a desired distance. In the illustrated embodiment this relationship requires 125 counts to move the chart the distance between major grid lines on the chart; however, other count-to-chart travel relationships could be a matter of design choice.

The stepper motor is powered by a Darlington switch chip 2 or other suitable drive circuit depending on the power requirements of the stepper motor. This drive circuit in the illustrated embodiment is a solid state chip called ULN2096B made by Sprague, Inc. The switches in the drive circuit 2 are responsive to output signals from a peripheral interface adaptor (PIA) or latch/buffer 3 which receives commands from the microprocessor 4. In the illustrated embodiment the PIA is an MC6821 and the microprocessor an MC6802, both made by Motorola, Inc. Programmed software is associated with the microprocessor to effect the desired chart drive and also other functions associated with the recorder operation but not part of this invention. Detailed explanation of the software operation associated with our invention follows. To effect proper unenergized detenting with the stepper motor a two phase permanent magnet motor is employed connected in the four phase drive circuit shown in FIG. 2. The drive sequence is shown in FIG. 3 for full step operation of the motor where the direction of rotation when stepping 1-2-3-4- is clockwise and 4-3-2-1- is counterclockwise. Full step operation, not half step, must be used to correspond to the non-energized detenting provided by the permanent magnetic poles of the rotor, however it will be understood by one skilled in the art that other stepping sequences such as wave stepping could also be used in conformity with our invention.

Figure 2:
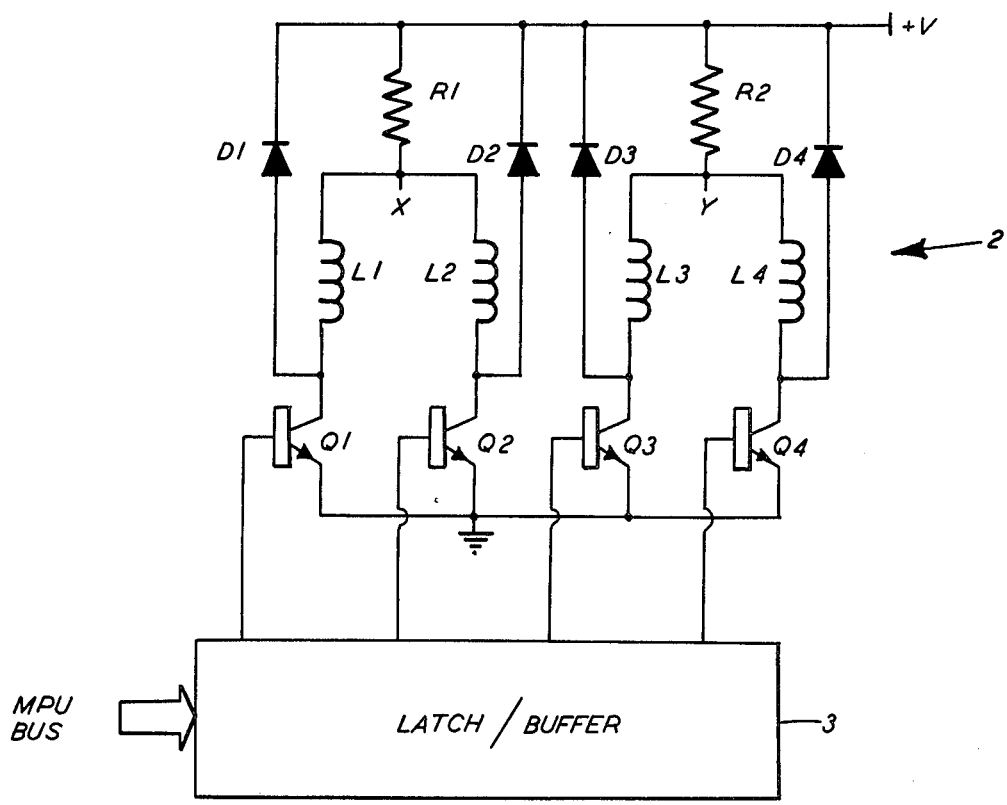
FIG. 2 shows a wiring diagram of the motor switching circuit.

In FIG. 2, the motor drive coils are shown as L1 through L4. Transistor switches, Q1 through Q4, pass or stop current through the motor drive coils by closing or opening connection from each coil to the ground side of the power supply. Resistances R1 and R2 will be recognized as conventional constant current connections to the high side of the power supply while diodes D1 through D4 allow the magnetic field energy of each coil to be rapidly dissipated when the coil current is switched off. Switching is effected by changing transistor base bias through the signal leads connected between the latch/buffer and the transistor base. When the signal goes high (+) current flows through the motor coil; when the signal goes low (−) the current is cut off.

Control signals generated by the drive curcuit are responsive to microprocessor commands resulting from the subroutine CHTSTP shown in Appendix A. These commands are coded by the microprocessor according to a table corresponding to FIG. 3 to address a peripheral interface adaptor (PIA) or latch/buffer in the drive circuit. Chart advance during data scan is effected through a software counter labelled STPWD. The CHTSTP routine using the stepper motor drives the paper the number of steps specified by the contents of STPWD when the routine is entered. After each step, i.e., pulse, applied to the stepper motor STPWD is decremented by one count, eventually reaching zero at which time the stepping is terminated.

Although the above described routine is known to the art, we have found that it is not satisfactory to simply terminate excitation to the motor after the last step is taken instead of leaving the motor in the excited condition of the last step. Should excitation simply be cut off the motor may or may not remain in the last commanded position. Position accuracy may therefore be impaired. We have found, however, that if cutoff of excitation is delayed for a predetermined period the indeterminacy of the final position disappears with the motor remaining detented at the last step position. This desirable result is effected by programming into the final lines of the program a delay period sufficiently long that the motor, which normally oscillates after stepping to the last position, will have time to settle so that its oscillation amplitude is reduced by damping to a maximum well within the effective detent limits. The excitation is then cut off after this delay, typically 5 to 10 msec., and the motor stays detented at exactly the last position.

Conventional methods of increasing damping by electronic means require more complex switching and provision of additional software requiring added memory space. The simple delay of this invention and minimum switching are a useful improvement not requiring conventional electronic damping.

The stepper motor drive subroutine takes up only a small part of the microprocessor's time and is returned to at intervals between other control and computational duties. When returning to the stepper motor routine we have found it desirable after determination from memory of the step code corresponding to the last step and after reenergization of the motor with this step code to again provide a delay to allow the motor to resettle in the proper starting position before stepping. We have found this to be particularly true in a multiple motor system where the microprocessor directs the stepping of several motors in consecutive time order. FIG. 4 shows a flow chart for such a multiple control routine and Appendix B shows object code for the routine. Only one motor is serviced by the routine at a time, the others being deenergized. In FIG. 2, the current limiting resistors R1 and R2 can be common to all motors, all motors being connected to point X and Y. Furthermore, a single power supply can be used for all motors since the power supply only supplies one motor at a time. The invention makes this economy possible without loss of setting accuracy for any motor through overshoot or through minor dislocation while detenting in an unenergized condition.

The invention described above provides advantages in reduction of heat dissipation and economies in power supply circuitry and control circuitry ensue from removal of excitation from single or multiple motor drives when not stepping. By our invention this can be done without loss of positioning accuracy. Although we have accomplished this by specific embodiments herein described, it should be apparent that modifications can be made to either the hardware drive or the software control routine without departing from the spirit and scope of our invention as defined in the following claims.

What is claimed is:

1. An improved stepper motor drive system comprising, in combination:
   a permanent magnet stepper motor,
   a microprocessor controlled switching circuit means for supplying drive pulses to said motor,
   a power supply for providing excitation current to said switching circuit means,
   control means operative through said microprocessor controlled switching circuit means comprising means for inputting a preselected count to counter means corresponding to a desired number of drive pulses to said motor, means for decrementing said counter means by one count after each pulse is applied to said stepping motor until a zero count is reached, and means for terminating said excitation current after a predetermined time delay subsequent to reaching the zero count.

2. The stepper motor drive system of claim 1 wherein means are provided to reenergize the motor in the same stepping phase as when deenergized.

3. The stepper motor drive system of any one of claims 1 or 2 wherein said stepper motor is one of a plurality of such motors.

4. The stepper motor drive system of any one of claim 1 or 2 wherein said power supply is a single power supply provided to energize a plurality of stepper motors one at a time.

5. The stepper motor drive system of claim 1 wherein said predetermined time delay is of the order of from about 5 to about 10 msec.

6. The stepper motor drive system of claim 1 wherein said control means operative through said microprocessor controlled switching circuit means further comprises means for providing reexcitation current to said motor in the same stepping phase as when the excitation current was terminated, and means for inhibiting the input of drive pulses to said motor for a predetermined period of time subsequent to providing reexcitation current to said motor.

* * * * *